United States Patent [19]

McFadden et al.

[11] Patent Number: 5,080,087
[45] Date of Patent: Jan. 14, 1992

[54] TWO BURNER BAKE, BROIL AND STEAM GAS OVEN

[75] Inventors: David H. McFadden, Lexington; Karen R. Benedek, Allston; William E. Lyle, Medford, all of Mass.

[73] Assignee: Gas Research Institute, Chicago, Ill.

[21] Appl. No.: 446,999

[22] Filed: Dec. 6, 1989

Related U.S. Application Data

[63] Continuation-in-part of Ser. No. 306,834, Feb. 6, 1989, Pat. No. 4,930,489, which is a continuation-in-part of Ser. No. 135,932, Dec. 21, 1987, Pat. No. 4,802,459.

[51] Int. Cl.$^5$ ............................................. F24C 15/32
[52] U.S. Cl. ................................. 126/21 A; 126/41 R; 126/21 R; 126/20
[58] Field of Search ................. 126/41 R, 21 R, 21 A, 126/20

[56] References Cited

U.S. PATENT DOCUMENTS

| | | | |
|---|---|---|---|
| 3,973,551 | 8/1976 | Caselani et al. | 126/21 A |
| 4,506,598 | 3/1985 | Meister | 126/20 X |
| 4,700,685 | 10/1987 | Miller | 126/20 |

Primary Examiner—Larry Jones
Attorney, Agent, or Firm—George W. Dishong

[57] ABSTRACT

This invention is an indirect fired gas burning device having typically two gas burner assemblies, a radiant heat assembly and a convection heat assembly. The combustion products of both burner assemblies are kept separate from the convection air which is circulated through the oven. The device is adapted to be mounted within or attached to a gas stove, having an oven therein and which provides an improved gas stove which can perform the functions of: (1) bake (with controllable cooking air flow rates); (b) broil using a radiant heat assembly such as a screen broiler "looking" through or transparent to the radiant heat generated by the broiler such as an infrared window (also a new low profile screen burner assembly is disclosed); (c) steam which is possible because of the very low vent rate of the oven, i.e., the oven is substantially sealed; (d) programmable cooking regimens which may use the bake, broil, steam or combinations thereof (the combi mode) in any desired sequence; and (e) pyrolytical self-cleaning due to the high efficiency of the heat exchange and the convection burner assembly. The hot combustion gases generated by the convection heat assembly are in thermal communication with the convection or cooking air through a special heat exchange which efficiently transfers heat from the hot combustion gases to the convection or cooking air while maintaining the integrity of the combustion assembly.

26 Claims, 8 Drawing Sheets

TWO BURNER BAKE, BROIL AND STEAM GAS OVEN

RELATED APPLICATION

This application is a continuation-in-part of application Ser. No. 306,834 filed Feb. 6, 1989 now U.S. Pat. No. 4,930,489 issued June 5, 1990, which is a continuation-in-part of application Ser. No. 135,932 filed Dec. 21, 1987 and now U.S. Pat. No. 4,802,459 issued Feb. 7, 1989.

BACKGROUND OF THE INVENTION

1. Field of the Invention

This invention most generally relates to an improved gas stove which has two indirect fired burner assemblies. An indirect fired burner is one in which the air for combustion is separated and not mixed with the convection air used for transferring heat to the food being cooked/broiled/baked. There may be multiple burner tubes or heat source devices associated with each burner assembly. The stove may have a capability to generate steam within the oven cavity of the gas stove or external to the cavity and ducted into the cooking space. The stove may also have a capability to be pyrolytically self-cleaning. The improvements speed the cooking time and results in the cooked food having retained a substantial amount of the flavor of the food prior to cooking. The improvement of the flavor of the resulting cooked food is a result, at least in part, of the control of the convection/cooking air, and/or by the introduction of steam into the oven cavity.

This invention more generally relates to gas stoves having two indirect fired burner assemblies, a bake and broil oven and an optional steam cooking capability. The optional steam cooking capability is possible due at least in part to the separation of the combustion gases from the air used to heat the food products—the convection air. The combustion gases are kept separate, in part through the use of a heat exchange and appropriate ducts, from the convection air used in the baking mode. The gases from the radiant heat source, the broiler assembly, are kept separate from the oven space, in part through the, use of a radian heat transfer apparatus which transfers radiant energy which maintaining the integrity of the oven volume. The gas stoves may be used either commercially and/or in the home and may be self-cleaning and have a broiling capability. More particularly the invention relates to a new indirect fired two burner assembly gas burning device such as a counter-top oven or a full sized oven which is capable of the functions of conventional and convection bake, broil, steaming, including programmable combinations of these various modes, and which may have a pyrolytic self-clean function. In the broil mode the radiant heat to the broiled products is indirect radiant heat in that the flame of the broil burner assembly does not "see" the broiling products. Further and preferably, a recirculation air blower may be variable in speed to control the baking regimen. There is thus provided a variable convection flow which permits high convection air flow rates for roasting and the like and permits low flow rates (conventional-like baking) for preparing more delicate baked products.

2. Description of the Prior Art

There are basically two approaches used to create the common gas oven configurations, the single cavity for bake and broil and an oven which features a large bake cavity and a smaller drawer for broiling. The single cavity designs use two separate burners to achieve bake and broil conditions whereas the two compartment approach shares a common burner.

To achieve bake conditions the single oven utilizes a gas burner subassembly located under the floor of the oven. The hot products of combustion flow through openings in the oven floor and heat the oven surfaces and interior space. This method of heating prevents the baked goods from looking directly at the burner. Broiling is accomplished by exposing the top surface of the food product directly to a highly radiant burner subassembly.

In a single oven approach, a separate broil burner is mounted at the top of the oven cavity looking directly down on the oven space. Typical broil burners are radiant screen or blue flame burner where the flame rolls over a metal spreader. With either approach, the burner looks directly at the food imparting a high radiant heat flux to the product. A single oven cavity approach is the typical configuration used for obtaining pyrolytic cleaning or self-cleaning oven performance. This cleaning process occurs when the soiled surfaces of the oven cavity reach temperatures in excess of 800° F. which usually corresponds to oven air temperatures in the range of 875° F. to 925° F. Maintaining this high temperature condition for an extended period of time will result in the reduction of food soils to a powdery ash residue. This cleaning process is most effective except in the regions of the door gasket where the short conduction paths to the cooler door result in somewhat cooler surfaces with resulting reduction in cleaning performance.

This single cavity gas range is a relatively recent advancement in oven design. In the older design, the oven is configured with a large baking oven cavity and a lower smaller broiler cavity. A single burner is mounted between the two cavities and this burner looks directly into the broiler drawer for the desired radiant heat energy input to the food. During bake the hot gases produced by the single burner flow through the oven floor into the bake cavity. This oven design is not typically or readily adapted or adaptable for self-cleaning temperatures.

U.S. Pat. No. 3,973,551 to Caselini et al discloses an arrangement which is substantially different from the subject invention in that it uses a single bottom burner combined with a recirculating fan or blower for circulating hot air throughout the oven. While the specification indicated that the oven can direct substantial heat from the top area, it is not specifically seen to disclose a capacity for broiling in the conventional sense.

German AS 1 241 080 is of interest as regards the disclosed invention in that it illustrates the use of a single top burner and a recirculating fan for heating an enclosed oven cavity. However, hot gases are not circulated through the oven, but rather around the oven cavity. Thus, there is not observed a broiling capacity and the overall arrangement is substantially different from the subject invention.

U.S. Pat. No. 3,659,579 to Henderson et al shows an oven capable of baking and broiling, as well as self-cleaning. A single burner at the top of the oven is utilized as both a broiling and baking burner, with a recirculating fan arranged to move hot air and products of combustion throughout the oven space. It is to be noted that both broiling and baking heat are supplied from the top of the oven, with the burner having a two-position configuration for broiling or baking. The overall arrangement of the burner and recirculating fan are seen to be considerably different from that used the subject invention as disclosed herein by Applicant.

U.S. Pat. No. 3,437,085 to Perry shows a single top burner arrangement for an oven that can bake, broil or self-clean. However, there is not seen to be disclosed in this patent any arrangement comparable to the recirculating/diverting fan arrangement used in the subject invention.

The patents to Herrelko et al U.S. Pat. Nos. 4,598,691, Henderson et al 3,659,579, Day 4,373,504 and Miller 4,700,685 describe systems which are very different from the present invention. They all disclose single burner elements, no separation of the combustion air and the convection air, no heat exchanger device and only a single fan or blower except for the patent to Day who does disclose two blowers. Additionally, except for the patent to Miller steam cooking is not disclosed. The patent to Ishii et al U.S. Pat. No. 4,648,381 does disclose two burners and also means for steam generation. However, again there is a single fan, but no heat exchanger, and no provision for the separation of the combustion and the convection or baking air.

It would be advantageous to provide an indirect gas fired oven having two burner assemblies which would operate in the broil, bake, steam and self-clean modes all done in one oven cavity. It would be of additional advantage if the amount of oven/convection air used for baking could be increased and/or controlled. The combustion air and the oven air or convection air being kept separate and the single oven being substantially sealed (tight and thus having a very low vent rate) from ambient air, allows for the economical introduction of steam into the oven cavity.

SUMMARY OF THE INVENTION

The invention is broadly directed to a gas oven which has two burner assemblies which are indirectly fired. More particularly, the invention is directed to a bake and broil gas fired oven. The oven would operate on a system of two burner assemblies, with one burner assembly for the baking mode and the other for broiling. In addition, the oven would incorporate features of an appliance having forced-air convection and steam.

The invention is basically a bake/broil/steam/self-clean gas fired oven. The new oven has two burner assemblies, one for the broil mode and the other for the bake and self-cleaning modes. In the broil mode the blower assemblies are in the off condition and the screen broiler assembly is activated. Note that in a closed door broil, the convection fan could be on two to draw grease laden vapors into a grease filter which may be located at the entrance of the convection blower. In the embodiment using a burner tube wherein the flame from the broiler tube travels along the radiant heat shield which radiates heat to the food products which are being broiled. In the bake mode the second burner tube only is fired and the two blower assemblies are effective to optimize the combustion air flow and the convection or baking air flow. The combustion air is separate from the convection air and the heat from the combustion air is transferred by means of a heat exchanger. Since the system is substantially sealed, it is feasible to introduce steam into the oven cavity to further enhance the cooking of foods. The oven with the steam is very nearly as fast as a microwave oven without the load sensitivity of the microwave oven. It is also about 2 times as fast as the conventional convection flow oven. The new oven also offers more functions and cooking regimens than either the conventional oven or the microwave oven.

Over the past 20 years consumers have developed a desire for appliances that are small, such as under cabinet models, and those that cook fast, such as microwave ovens. Consumers also want meals that can be prepared as quickly as possible, such as frozen entrees, and foods that are as appealing and retain as many nutrients as possible. In order to satisfy these needs, however, consumers must often sacrifice quality for speed, or alternatively obtain high quality by eating in a restaurant or ordering take-out (thereby sacrificing low cost and convenience). This invention is directed to providing for the desires of the modern consumer and to providing a technology which is believed to provide cooked foods having better quality, and being more conveniently, economically and efficiently prepared.

In order to arrive at the advanced cooking appliance, six basic modes of cooking were examined relative to use by the consumer: broiling, baking, microwaving, steaming, frying, and boiling. Boiling negatively impacts the flavor and nutrient content of some foods, frying requires a large amount of fat to use, and baking and roasting are slow. Thus, it would be advantageous to provide an appliance that uses several cooking modes independently or in combination to produce cooked foods cooked to satisfy the full range of consumer preferences.

In order to achieve the objectives of this invention, as stated above, it was determined that a low oven vent rate was needed to achieve an oven capable of producing a high dew point oven (180° F. to 212° F.) with a minimum of water usage while operating in a bake, convection bake, low temperature bake (steaming) or broil mode. To achieve, for example, a 190° F. dew point in a 350° F. oven with vent rates typical of direct fired ovens would have required 5 times or more water than what would be needed for a low vent rate cavity. The result would be that additional energy input would be needed for steam generation and for providing for the kitchen ventilation of the moisture generated by the device. Because of the need for a low vent oven which has a sufficient vent rate to support combustion, it was determined that the air used for baking and/or high convection cooking or for broiling must be kept separate from the combustion products thereby resulting in a very low oven vent rate and which consequently results in a rapid and efficient heat-up of the oven volume. A special heat exchanger was developed which provided for the heat transfer from the hot gases of combustion to the cooking air or convection air. Additionally, a low profile, very efficient screen broiler assembly was developed which, when used in conjunction with a radiant heat transfer device, provided for the effective and efficient broiling of food products placed in the single oven cavity. The radiant heat transfer device also sealably separated the broiler and the combustion products from the oven volume.

It was also determined that it would be advantageous to provide controlled steam for steaming and steam cooking. By using steam, it would be more than twice as fast as a conventional oven and almost as fast as a microwave oven and the foods so prepared using steam would retain more of the food's nutrients. Combinations of convection baking (high convection air flow rates) or conventional baking (lower convection air flow rates) and steaming would also provide advantages. Steaming was feasible due, at least in part, to the low oven vent rate. A small economical atmospheric boiler was designed to fit into a counter-top oven configuration. A function-controller was designed which controls the various cooking regimens which the consumer requires.

The performance advantages of this oven whether it be the countertop configuration or the full-sized oven over current full size or countertop gas or electric ovens are significant. They have superior cooking performance because of very uniform temperatures as well as the advantages that steam affords in baking and/or cooking. Extensive cooking studies examined different modes of cooking and showed that convection baking with steam produces more flavor development in the food product as compared to convection bake, conventional bake, broil or steam alone. Convection steam can impart as much flavor development as frying. In addition, steam can be introduced into the cavity to improve a variety of products such as custards or french breads, or to steam vegetable on their serving tray. This oven can prepare food in a manner than can greatly accelerate the cooking/reheat time and produce a superior product.

The improved oven will steam fresh vegetable on an uncovered straying plate which eliminates the need for a separate covered dish. Operating at 195° to 205° F. dew point at an oven temperature of 250° F. and low convection air flow produced excellent results. Using combi mode (steam with hot convection oven flow) can greatly accelerate the reheating of frozen products. For moderate to large food loads (greater than 1 lb) the gas countertop oven of this invention had a cooking time very competitive with the microwave oven and this gas oven produces a higher quality product. For example, when reheating a frozen 21 ounce meat lasagna to a center temperature of 90° F., the countertop oven capabilities with respect to food quality exceeded a fully featured microwave and was as fast as the microwave. The table below summarizes the results.

| APPLIANCE | REHEAT TIME | COMMENTS |
| --- | --- | --- |
| New countertop oven 195° F. dew point | 27 min. | Nice browning of cheese topping @ 375° F. oven with no shrinkage at edge |
| 650 W. microwave | 29 min. | Very dark top and considerable shrinkage |
| 30" electric oven | 65 min. | Nicely browned little shrinkage @ 375° F. setting |

A primary object of the present invention is to provide an improved gas stove which has better broiling, baking and self-cleaning characteristics than currently available gas stoves and which meet or exceed the established ANSI Z-21.1 emission standards and has a temperature profile which meets or exceeds all ANSI gas oven design requirements.

An additional primary objective of this invention is to provide an improved gas stove/oven which has the following cooking modes; conventional bake, convection bake, broil, steam and combi mode (meaningful combinations of the bake, broil and steam modes) and also provide for pyrolytic self-cleaning of the oven cavity.

A further primary object of the invention to provide an indirect fired gas burning device in the form of a radiant screen broiler which is attachable outside of the oven cavity and in close proximity with a high temperature glass or other material, an infrared (IR) window, which will permit radiant heat energy from the screen broiler to enter the oven cavity while at the same time maintaining the integrity of the oven cavity—that is, keep the combustion products or gases separate from the region or volume in which the broiling is taking place. There is provided an indirect fired low profile screen burner assembly appropriately connected to a source of gas and an appropriate means of ignition comprising: means for forceably providing combustion air into an air/gas mixture chamber in a direction substantially orthogonal to a direction in which gas is injected into said mixture chamber, said mixture chamber; an air/gas mixture distribution channel contiguous with and in air/gas mixture communication with said distribution channel; a plurality of holes in said air/gas mixture distribution channel, said holes providing for air/gas mixture communication from said distribution channel to at least one plenum; and at least one screen positioned below said at least one plenum which at least one plenum provides for a substantially even distribution of air/gas mixture to at least one screen in which a flame is established upon combustion of said air/gas mixture thereby generating infrared radiant heat energy.

A still further primary object of the invention is to provide a means for indirect firing of two gas burner assemblies, one for broiling and the second for baking and pyrolytic self cleaning of an oven with which the burner assemblies relate and which provides for the efficient heat transfer from the heated combustion air to the air used in baking i.e., the convection air. Indirect firing shall mean the keeping of the combustion gases separate from the oven convection air. The indirect firing is achieved in part through the use of a heat exchanger and appropriate ducts, thus permitting and making feasible the introduction of steam into the oven cavity. The steam being generatable in a specially designed high efficiency atmospheric boiler and steam injection assembly which is controllable as to the amount of steam and the time sequence of the injection of steam into the oven cavity.

Yet another object of the invention is to provide a gas burning device for use as a radiant and a convection heat source in a gas stove having an oven cavity therein said device comprising: a convection air assembly adapted to provide heated convection air into said oven cavity; a combustion assembly having therein a convection heat assembly for providing heated combustion gases which gases are in thermal communication with said convection air thus causing said convection air to be heated convection air and a radiant heat assembly for providing radiant heat energy to said oven cavity wherein said radiant heat assembly is preferably a screen burner assembly positioned above but proximate to said radiant heat transfer assembly; a heat transfer assembly for the transfer of heat from said heated combustion gases to said convection air; radiant heat transfer assembly for providing for radiant heat communication between said radiant heat source and said oven cavity but keeping combustion gases from said radiant heat source separate from said convection air; a controllable steam generation and steam injection assembly for injecting steam into said oven cavity; function-controlling assembly, said functions controlled comprising; selection of and sequencing of said convection heat assembly and said radiant heat assembly, steam and the amount thereof generated by said steam generation and steam injection assembly and time of steam injection; means for controlling temperature of said oven; means for appropriately mounting said steam generation assembly onto said gas stove; and means for attaching said gas burning device to said oven cavity.

A still further object of the invention is to provide an improved gas stove having an oven cavity; means for providing a radiant heat source and a convection heat source; means for providing partially mixed gas and air to at least one burner assembly controllably selected from a plurality of burner assemblies in said radiant and convection heat source; means for sensing and for controlling the temperature of the oven cavity; means for igniting said at least one burner assembly; an oven access door; said improvement comprising: means for providing convection air into said oven cavity; means for providing for radiant heat communication between said radiant heat source and said oven cavity but keeping combustion gases from said radiant heat source separate from said convection air; means for generating heated combustion gases from said convection heat source for cooking and oven cleaning, wherein said heated combustion gases are integral to said means for generating said gases and separate from said convection air; means for transferring heat from said heated combustion gases to said convection air; means for controllably generating and injecting steam into said oven cavity; means for function-controlling of said stove, said functions controlled comprising; selection of and sequencing of said convection heat assembly, said radiant heat assembly, steam and the amount thereof generated by said means for steam generation and time of steam injection; and means for controlling temperature of said oven.

These and further objects of the present invention will become apparent to those skilled in the art after a study of the present disclosure of the invention.

DESCRIPTION OF THE PREFERRED EMBODIMENTS

Figure 1:
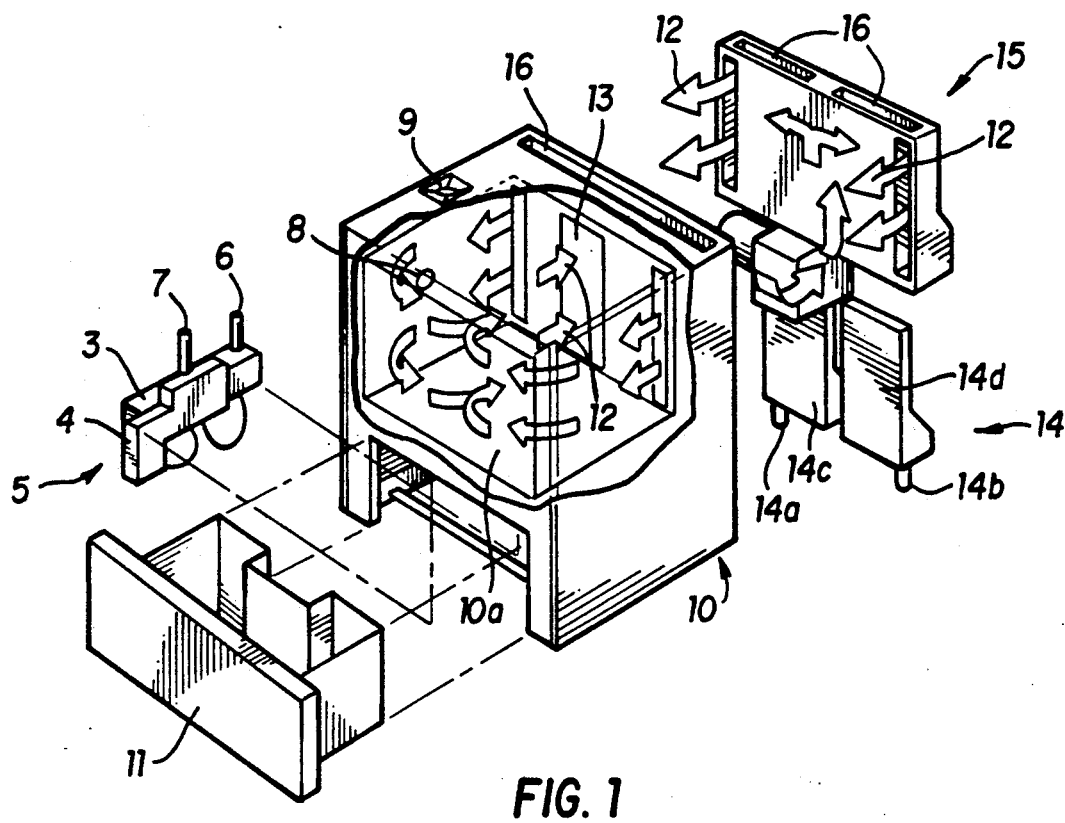
FIG. 1 is an exploded perspective schematic of a full sized oven according to the invention.
Figure 2:
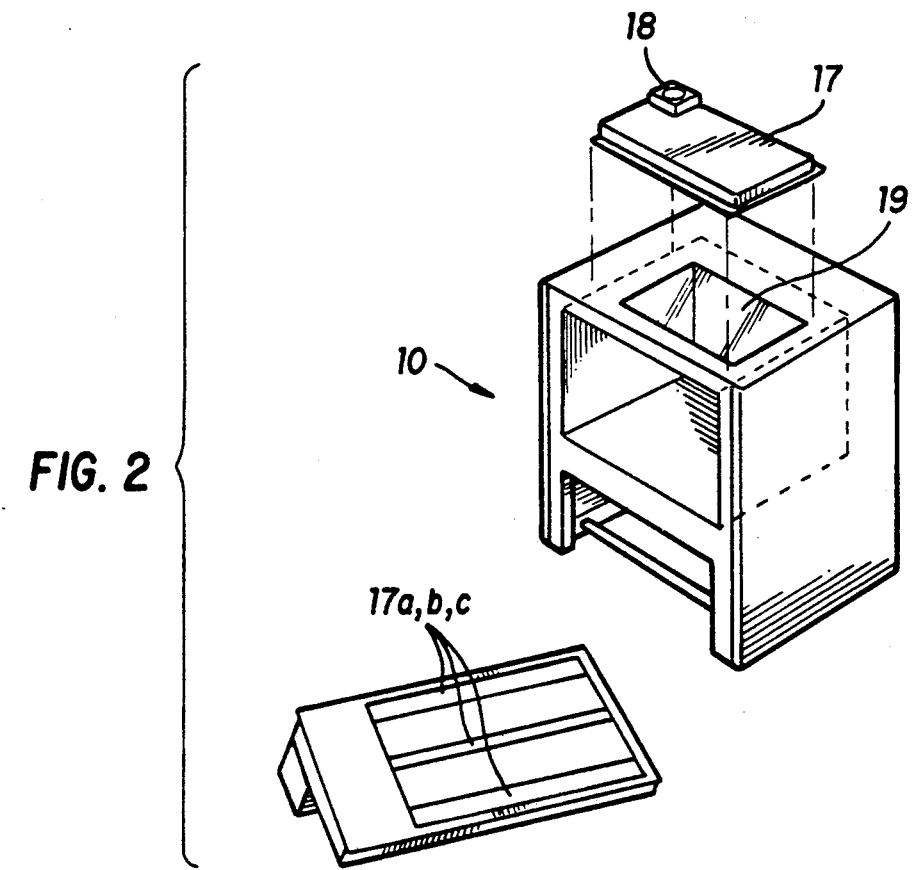
FIG. 2 is a perspective illustration of a low profile gas radiant screen broiler assembly with three radiant screen strips showing the location of the screen broiler relative to a radiant heat transfer device such as high temperature infrared glass.
Figure 3:
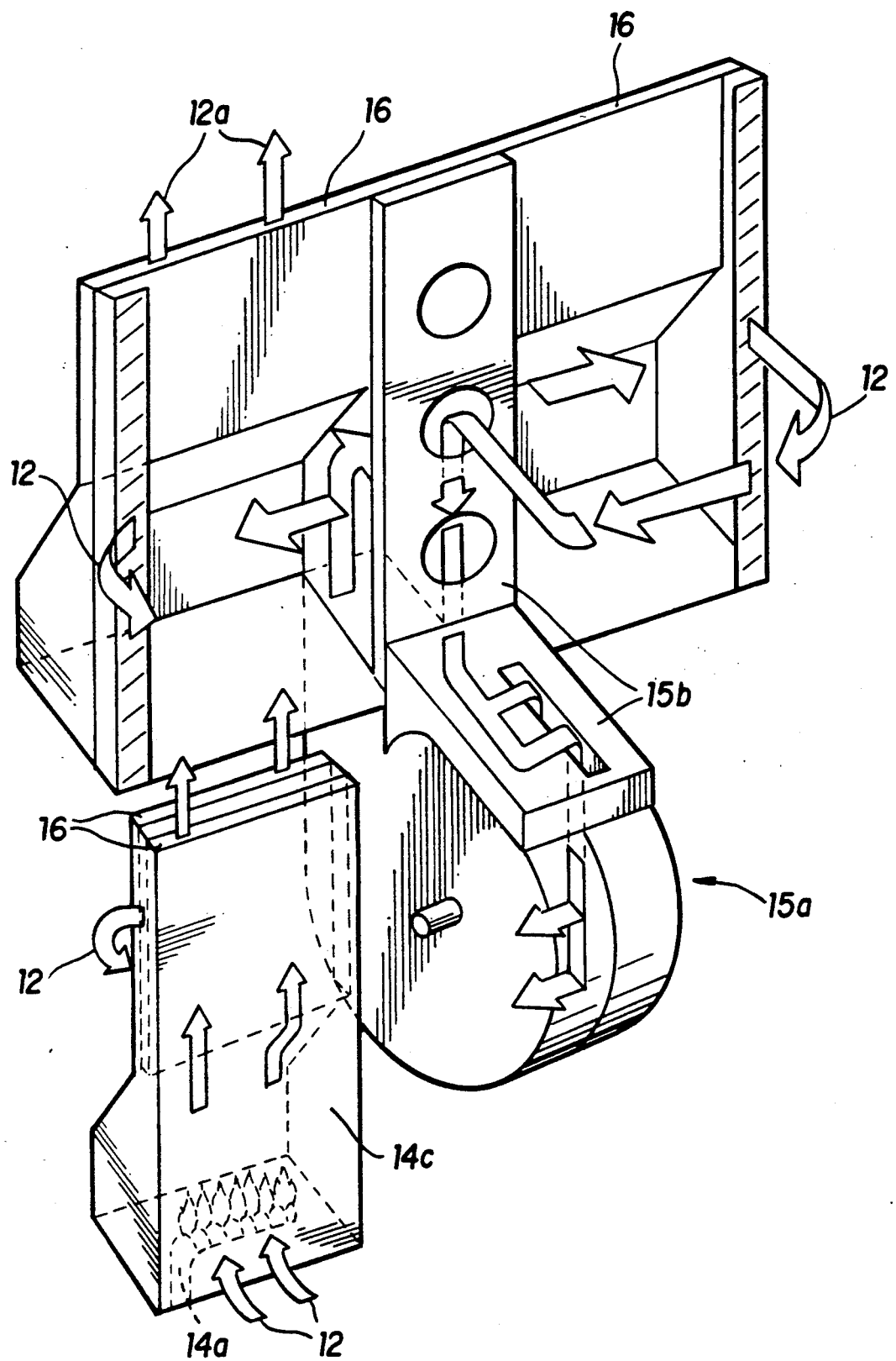
FIG. 3 is a perspective illustration of a two burner tube convection heat source and convection heat assembly illustrating a heat exchanger and a convection air assembly.

The following is a description of the preferred embodiments of the invention. For the purpose of illustration, the method and device of the instant invention will be described primarily with regard to how the device and method is used within a gas stove and particularly to provide the heat energy and steam to an oven cavity of a typical consumer type of gas stove appliance. The oven cavity and the convection air or cooking air which is circulated therethrough is maintained separate from the combustion air and the combustion products associated with the gas burning devices such as burner tubes and screen burners. It is understood that the gas burning device as illustrated and described herein may have different dimensions and variations of the illustrated basic geometry. Further, the invention will be explained in sufficient detail using a countertop type of oven configuration; however, it is clear that full sized ovens can be made to perform in a similar manner by scaling and/or by using a plurality of burner tubes in the burner assemblies. FIGS. 1, 2 and 3 have been included simply illustrate, but not describe in detail, a preferred or a typical embodiment of the invention used with a so-called full sized stove 10 and oven 10 (a).

In these figures there is shown the location of a multiple burner low profile screen burner/broiler assembly 17 (which incorporates an axial blower 18 to distribute the air for combustion forcefully through the screen burner assembly and burners 17 (a), (b) and (c) used as a radiant heat source for broiling of food products placed in the oven 10(a), a radiant heat transfer assembly as an infrared window 19 which is transparent to the radiant heat energy from such as hot broiler burners 17(a), (b) and (c), the heat exchanger assembly 15 used to transfer heat from combustion gases 12(a) to the cooking or convection air 12 which is circulated through the oven 10(a) by the blower assembly 15(a). The blower assembly 15(a) comprises a blower inlet duct 15(b) which directs the oven/convection air 12 from the oven 10(a) into a blower unit out of the blower unit through the heat exchanger assembly 15 in which the combustion gases 12(a) give up heat to the convection air 12 through the combination of the convection heat source insert portions 14(c) and (d) and the heat exchanger 15. Fresh air or replacement air is channeled into the convection heat source 14 close to burners 14(a) and (b) to enhance or improve the combustion of the gas at the burners. The fresh air and the products of combustion 12(a) which have cooled because of the giving up of heat to the convection air 12 are vented through exhaust vent 16.

The heat exchanger inserts, 14c and 14d, are designed to provide efficient heat exchange with the oven air 12 by restricting excess fresh air for combustion and reducing the combustion flow, 12a, flow area as flow 12a cools in the process of giving up its thermal energy. The amount of air vented may be controlled by the size of the opening 16 provided for exhaust of the combustion air or the size of the inlet opening for the fresh air or so-called replacement or secondary air. The air needed for combustion in the screen burner assembly 17 may be channeled with appropriate ducts or tubes from the same fresh air inlet which provides the fresh air for the bake burners 14(a) and (b).

Drawer 11 is the usual storage drawer found in full size ovens. The steam generator 5 with its boiler 4 and water reservoir 3 is shown mounted in the region of drawer 11. Water may be put into the reservoir 3 through the water fill hole 9 and fill tube 6. The steam injection means, in this instance a steam tube 7 and steam vent 8 are schematically shown in FIG. 1. The location of these components may be varied according to the design of a particular stove.

Not illustrated is the function-controller and all of the associated components which would be known to one of ordinary skill. Also not shown are such obvious components as sources of gas, gas lines, appropriate valves, igniters and the like. It is also obvious to provide for the use of insulation in the walls of the oven 10(a) to control the heat generated within a heated oven especially when pyrolytic cleaning is taking place.

Figure 4:
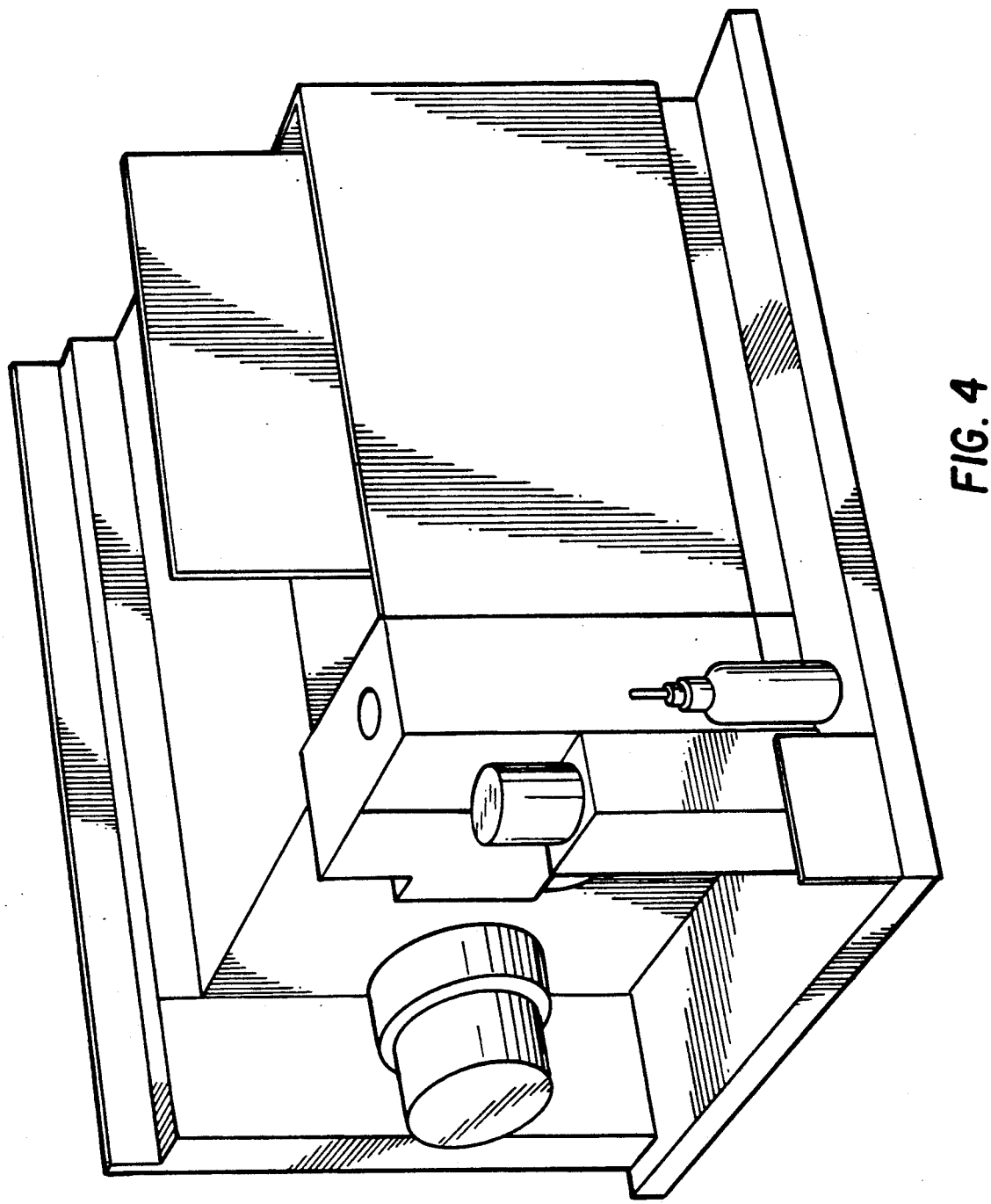
FIG. 4 is a copy of a photograph showing actual placement of some of the components in a countertop oven according to the invention.

FIG. 4 is a photograph of a countertop oven which has the outside jacket or cover removed. Shown are the relative locations of some of the major components of the invention. It is understood that the details relative to the many components of the oven cannot be discerned from this FIG. 4. The FIG. 4 simply shows a particular embodiment of a countertop oven in which is incorporated the instant invention.

Figure 5:
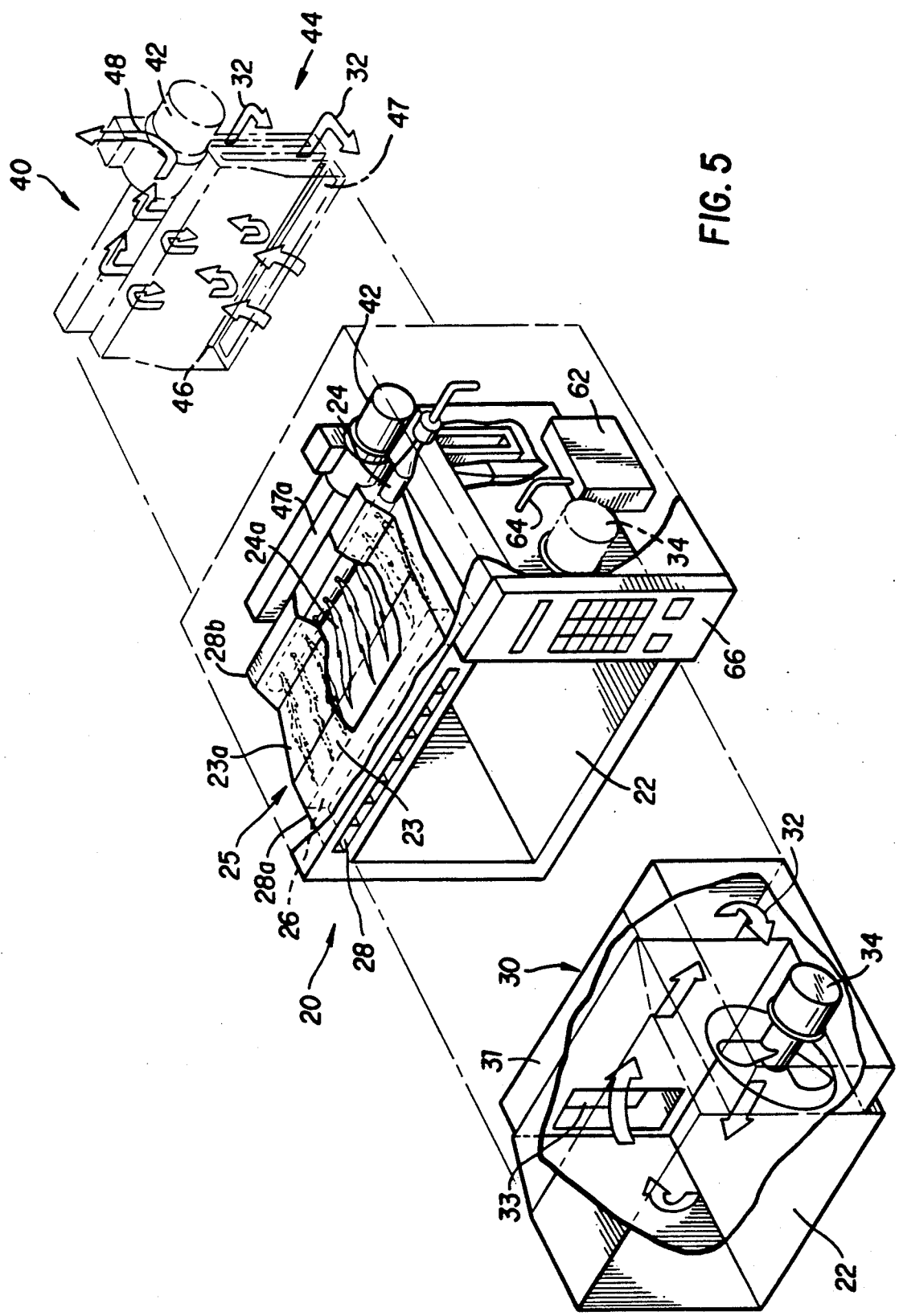
FIG. 5 is a perspective view of a gas stove utilizing the indirect fired gas burning device illustrating the flame configuration when the stove is operated in the broil mode.

In FIG. 5 there is illustrated a particular embodiment of the indirect fired gas oven 20. The means for providing convection air 30 which is made up of housing 31 and convection air blower 34 which may be controllable as to rate and volume of flow of convection air 32. There is also shown a combustion air assembly 40 which includes bake burner tube 46, fresh air vent 47 which directs fresh air for combustion over bake burner tube 46 and a convection air heat transfer assembly 44 which in this instance is a heat exchanger which isolates or keeps separate the combustion air 48 and the convection air 32. A combustion air blower assembly 42 which develops, as needed, an induced flow of fresh air/combustion air 48 over the burner tube 46 and through the combustion air passage of the heat exchanger 44 to exhaust vent 28 is also shown as part of combustion air assembly 40. In the bake/self-clean mode, a controlled volume of convection air 32 is circulated from the oven 22 into the convection air housing 31 by means of the convection air blower 34. While convection air 32 is within housing 31 heat is transferred from combustion air 48 to the convection air 32 when the oven 20 is operating in the bake/self-clean mode. The volume of convection air flow is high for convection baking-/cooking and lower for normal baking regimens.

In the broil mode, blower 34 is normally not operating. The radiant heat source assembly 25, which is made up of a broil burner tube 24 located at the input end of a broil flame channel 26, which channel is formed by spreader 23(a) and by the radiant heat transfer means 23 which in this embodiment may be a metal plate sealably affixed to the roof of the oven 22, and a means for directing fresh air 28(b) to the broil burner tube 24 and for exhausting the combustion products from the broil burner tube 24 through an exhaust duct 28(a) to an exhaust vent 28. Fresh air is brought into the oven assembly 20 through fresh air vent 47 and is channeled to broil burner tube 24 to support combustion. The broil flame 24(a) is contained in the broil flame channel 26 and the combustion gases are vented from the oven 20 by exhaust vent 28. The radiant heat from burner tube 24 is transferred into the oven cavity 22 via radiant heat transfer means 23. Radiant heat transfer means may be a metal plate which is sealably attached the oven 22 keeping separate the oven volume from the radiant heat source assembly 25 which along with the convection heat source, bake burner tube 46, forms the combustion assembly of the countertop oven 20.

The broil flame 24(a) attaches to the upward facing surface of the shield plate or radiant heat transfer means 23 because, in part, the shield plate 23 slopes upward and forward toward the front the oven cavity 22 and that a spreader plate 23(a) be located above the shield plate 23 to further confine the broil flame 24(a) and that a sufficient sized front-facing broil flame channel opening exist so as to allow the broil flame 24(a) to "roll up" the shield plate surface 23 and eventually toward the exhaust vent 28. The broil flame 24(a) is contained substantially between the spreader plate 23(a) and the shield plate 23.

Figure 6:
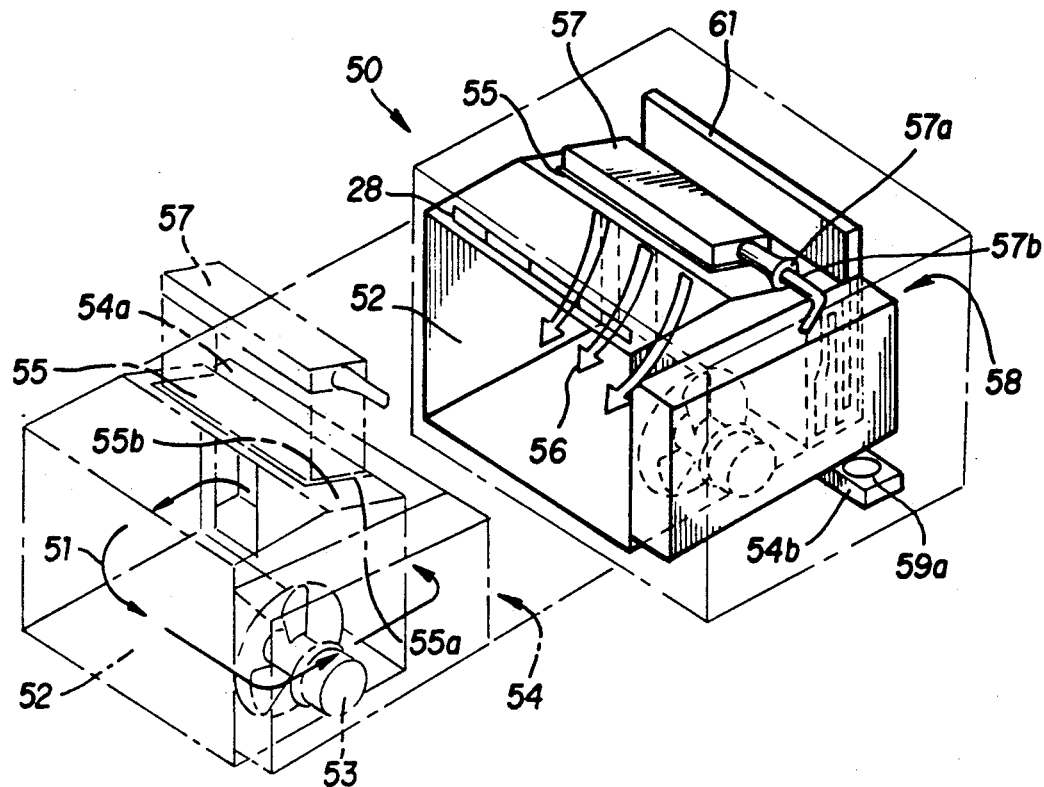
FIG. 6 is a perspective view of a gas stove utilizing the indirect fired gas burning device illustrating the use of a screen broiler assembly as a radiant heat source when the stove is operated in the broil mode.
Figure 7:
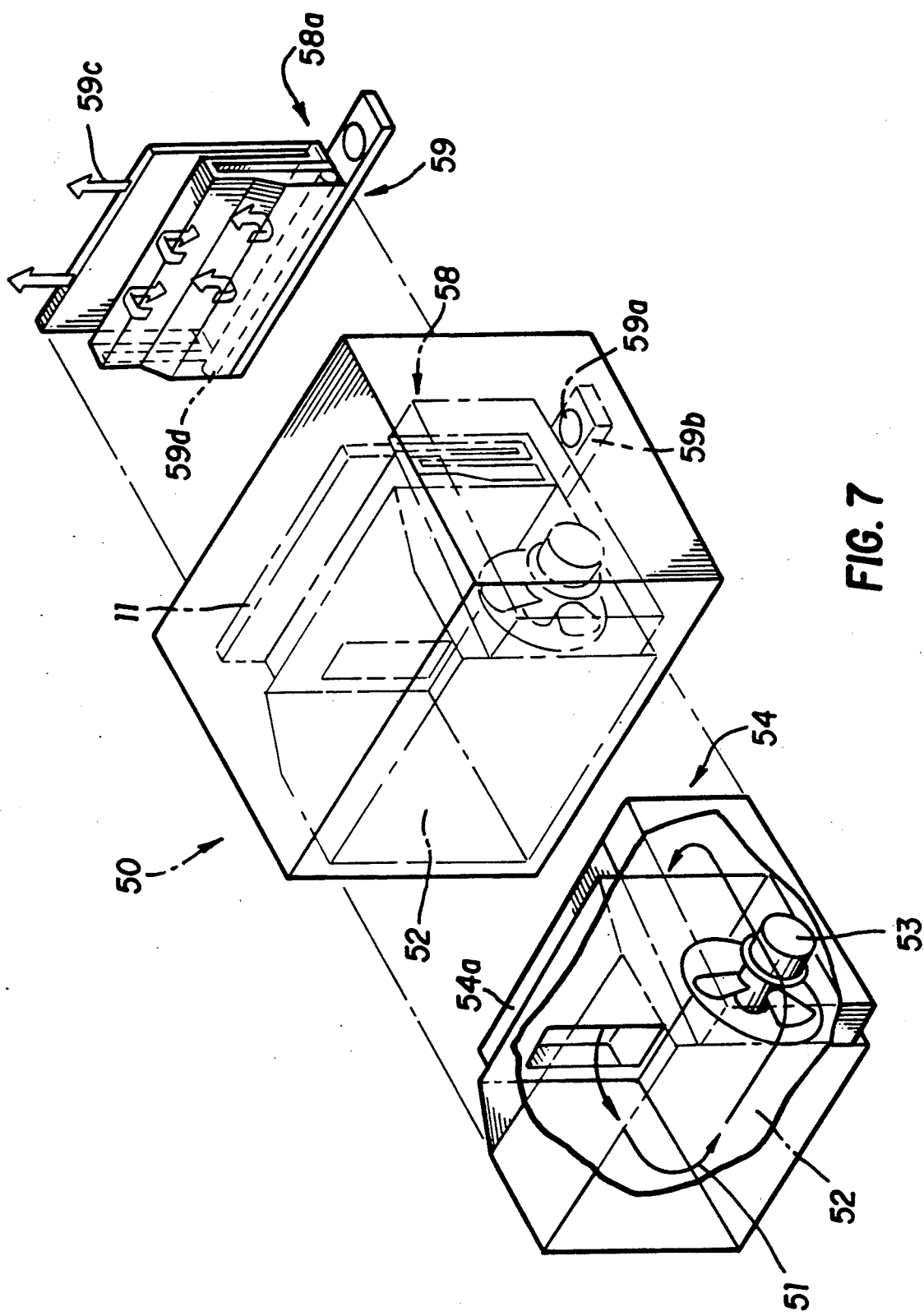
FIG. 7 is an exploded perspective view of a gas stove utilizing the indirect fired gas burning device illustrating possible positioning of convection air assembly and combustion air/fresh air assembly and illustrating the combustion and the convection air flow when the stove is operated in the bake/self-clean mode and the bake burner assembly is developing heated combustion gases, the broiler components being transparently illustrated.

FIG. 6 illustrates the use of a screen broiler 57 as the radiant heat source and an infrared window 55 sealably attached to the oven cavity 52. It is clear that the radiant heat energy 56 "shines" through the IR window 55 and onto food products which may be placed in the oven cavity 52. When the countertop oven 50 is operating in the broil mode normally convection air blower 53 is not operating. However, there may be some cooking regimen in which it would be advantageous to operate blower 53 to provide a controlled flow rate of convection/oven air 51 as shown in FIG. 7. It is understood that associated with the screen burner assembly 57 there are the appropriate and necessary provisions made for supplying gas and air, ignition, venting of the combustion products and devices which control the operation of the screen burner assembly 57. Clearly, fresh air for combustion could be provided to the screen burner by way of a duct or tube which combines the fresh air 57a for combustion with the gaseous fuel provided by gas nozzle 57b prior to the distribution of this combustible to the screen broiler 57. Venting of the combustion products could be through exhaust vent 28. These obvious features are not shown so that the invention can be more clearly illustrated by the numerous drawing figures.

FIG. 7 illustrates, in an exploded perspective, an indirect fired gas oven 50 of the present invention operating in the bake/broil/self-clean mode. It should be pointed out that in this FIG. 7 the sealed indirect fired radiant heat assemblies 25 and 57 as well as the radiant heat transfer assemblies 23 and 55 are not shown so that the convection air assembly 54, the combustion air assembly 58 and the heat exchanger 58(a) may be more clearly shown in relation to each other and within the gas oven 50.

Figure 8:
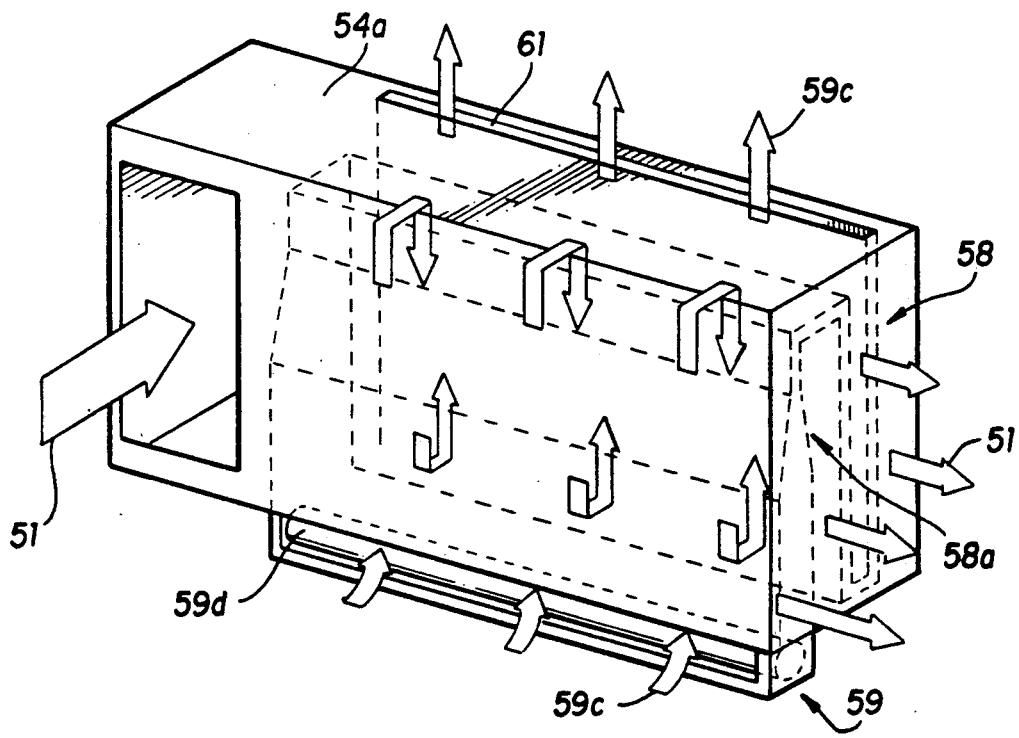
FIG. 8 is a perspective view of a possible heat exchanger assembly in a gas stove utilizing the indirect fired gas burning device and illustrating the convection air flow from the oven cavity, into and out the heat exchanger.

FIG. 8 is a more detailed illustration of the preferred embodiment of the combustion air assembly 58 shown within housing portion 54(a) of the convection air assembly 54. The combustion air assembly 58 is made up of a convection heat source 59 and the convection heat transfer assembly 58(a). The fresh air input vent 59(a) shown in FIGS. 6 and 7, the fresh air duct 59(b) which directs fresh air or replacement air 59(c) over the bake burner tube 59(d) all go to make up convection heat source assembly 59. The particular combination of the convection air assembly 54, the combustion air assembly 58 and the convection heat transfer means 58(a) allows for the oven 50 to be indirect fired and permits the feasible introduction of steam into the sealed oven cavity 52 and still provide, with the radiant heat source assembly such as 57, a broil capability within oven cavity 52. In order to achieve the objective of providing for atmospheric pressure steam.

In the embodiments depicted in FIGS. 7 and 8 the combustion gases/air 59(c) is kept separate from the oven air or convection air 51. That is, the combustion air 59(c) is integral with the combustion air assembly 58. The combustion air 59(c) being in thermal transfer association but not mixed with the convection air 51 of the convection air assembly 54 through the heat exchanger 58(a). The radiant heat source burner 57 and the convection heat source burner 59(d) are thus said to be indirect fired.

In FIG. 5 there is pictorially illustrated a steam generation means 62, a steam injection means 64 and a function controller 66. The steam generator and injector means 62 and 64 are not shown in FIGS. 6-8 only to improve clarity of the disclosure. In the preferred embodiment the indirect fired gas oven 50 would have; a convection air assembly 30 or 54, a combustion air assembly 40 or 58, a convection heat source 59, a radiant heat source 25 or 57, a radiant heat transfer assembly 23 or 55, a convection heat transfer assembly 58(a), a steam generation 62 and injection assembly 64 and a function controller 66 operated by a touch pad assembly in order to control the various components of the system and thereby provide for a broad variety of cooking regimens.

Figure 9:
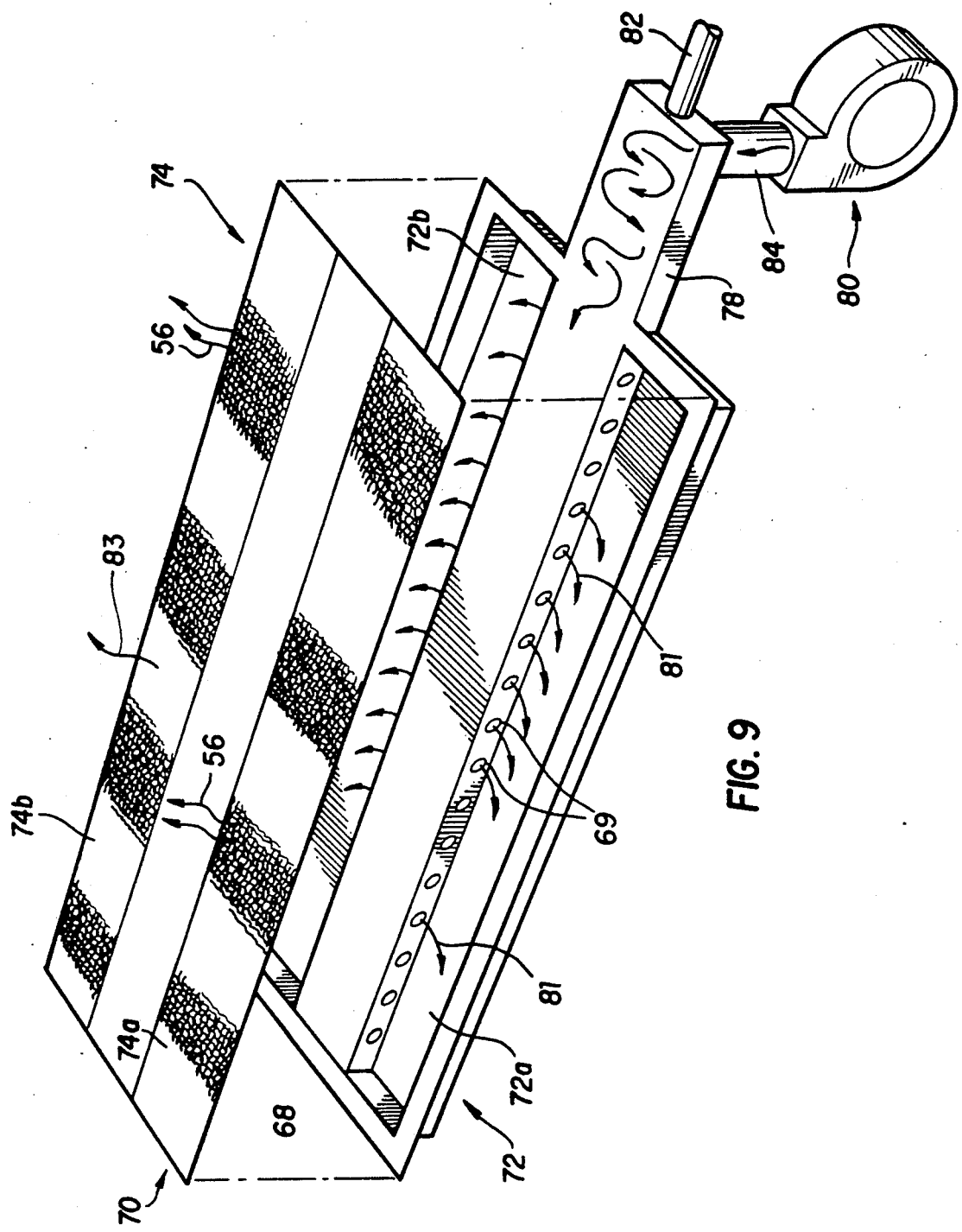
FIG. 9 is an exploded perspective view of a novel low profile indirect fired screen broiler assembly illustrating the air/gas flow.
Figure 10:
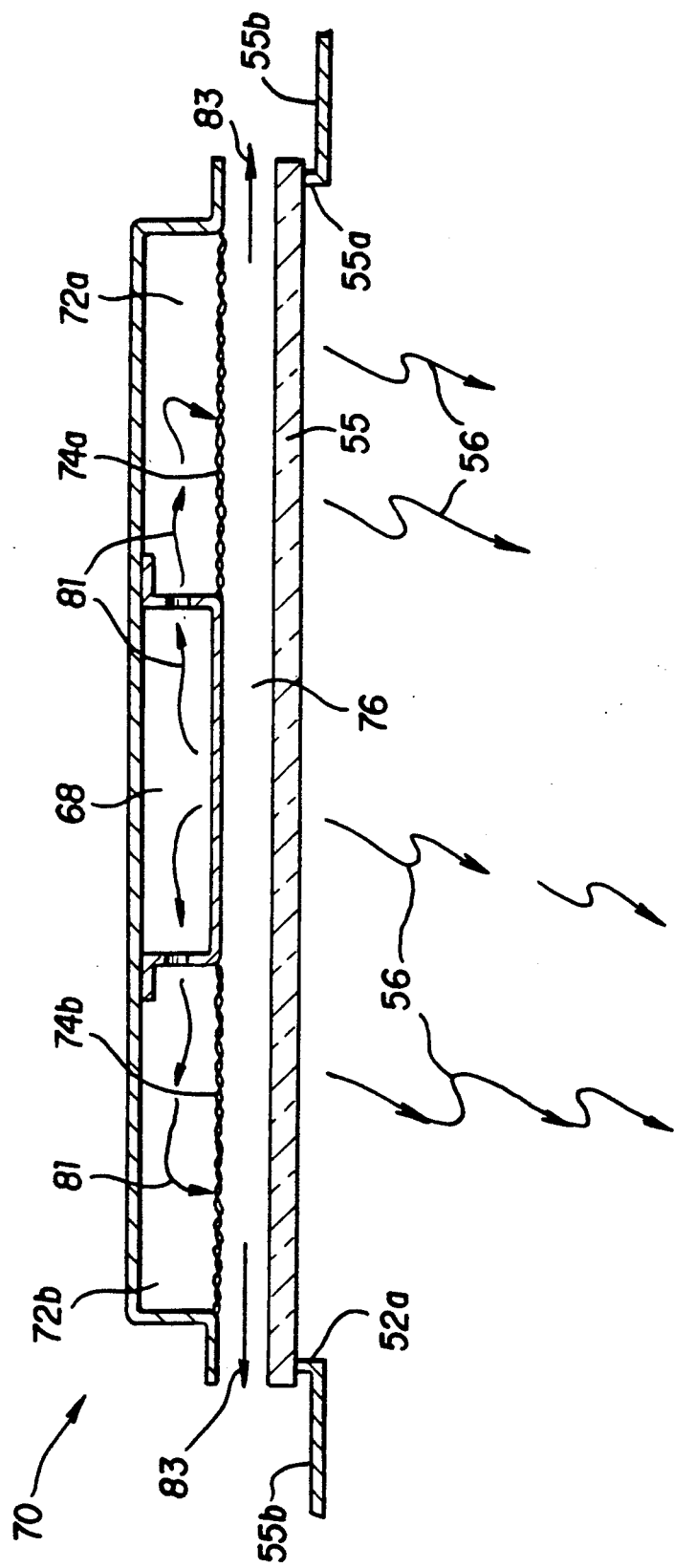
FIG. 10 is a cross section view of the novel low profile indirect fired screen broiler assembly illustrated in FIG. 9 and showing the relationship of the broiler assembly with the radiant heat transfer device.

A low profile screen broiler assembly 70 has been developed for use in the countertop stove 50. The low profile indirect fired screen broiler 70 is illustrated in FIGS. 9 and 10. The low profile indirect fired screen broiler 70, which may be use in the place of radiant heat sources 17 and 57, is possible because of: (1) an efficient, gas/air mixing design that results in a fully premixed fuel/air flow in a minimum of space: (2) pressurized combustion allowing the screened broiler to be mounted very close to the radiant heat transfer assembly such as an infrared window 55. By positioning the gas jet 82 at right angles to the discharge flow of combustion air from the combustion air assembly 80, which assembly includes at least blower 82 and duct 84, results in a swirl effect within air/gas mixing chamber 78 which rapidly mixes the fuel and air. This flow 81 is then turned again to impart additional flow vorticity, providing additional opportunity for complete mixing of the fuel and air. The air/gas mixture 81 is then forced or channeled through the air/gas distribution channel 68 out through a plurality of holes 69 in the side walls of the distribution channel 68 and into plenum 72 which is positioned over screen 74. In the embodiment illustrated, the plenum 72 and the screen 74 are divided into two plenum cavities 72(a) and 72(b), and two screens 74(a) and 74(b) by distribution channel 68. The screen 74 holds the flame thereby creating the infrared heat source. By achieving a well mixed gas/air flow, the fully premixed stream of air/gas 81 can be directed immediately into the distribution channel 68 which is used to supply the air/gas mixture 81 evenly via plenum 72 along the length of the screen burner assembly 70. The screen 74 has two functions which are to: (1) provide flow resistance to the premixed air gas mixture 81 stream for uniform combustion over the screen 74 area; (2) hold the flame creating an IR burner necessary for indirect broil. The combustion is above atmospheric conditions, resulting in a pressurized combustion zone. This zone can now be closely coupled to the glass 55 producing a compact broiler 70 with a maximum radiation heat transfer coefficient. Between the glass 55 and the screen 74 there is provided a space 76 in which the products of combustion 83 travel to an exhaust vent. The glass 55 is sealably attached 55(a) to oven wall 55(b) thereby keeping the products of combustion 83 separate from the air in oven cavity 22.

Since the combustion air 59(c) and the convection air 51 are separate and since the loss of convection air 51 occurs substantially only when the oven cavity 52 is opened, it becomes very feasible to use steam to enhance cooking and baking and to reduce the time needed to properly prepare foods. It is significant to note that by using steam, the cooking time would be about twice as fast as the cooking time for an oven not using steam or a conventional prior art oven. The cooking time would be almost as fast as a microwave oven but the oven of this invention using steam would not be nearly as load sensitive as are the microwave ovens. In addition, since the present invention uses gas instead of electricity as the source of energy for the generation of the heat, it would be capable of higher and more flexible rates of heat input. Since the instant invention may also be microprocessor controlled, it would be possible to have numerous preprogrammed recipes which use optimally the various cooking modes available in the instant invention.

It should be further noted that combination of modes of cooking are possible. That is, it is possible to both steam and convection cook simultaneously. It is also possible to sequence broiling, steaming and convection cooking in any order. For example, a roast beef cut of moderate tenderness might be baked first in dry heat at high temperature to develop exterior color and flavor, then cooked at more moderate temperatures with controlled steam input to tenderize and complete the cooking process in faster time than with dry heat only.

It is thought that the indirect fired gas burning device of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:

1. An indirect fired gas burning device for use as a radiant heat source and a convection heat source in a gas stove having an oven cavity therein said device comprising:
    means for providing convection air into said oven cavity;
    means for generating heated combustion gases wherein said heated combustion gases are integral to said means for generating said gases but distinct and separate from said convection air and which combustion gases are in thermal communication with said convection air thus causing said convection air to be heated convection air;

means for transferring heat thus providing said thermal communication from said heated combustion gases to said convection air and wherein said means for transferring heat maintains said distinctness and separation of said heated combustion gases and said convection air;

means for providing radiant heat energy transferable to said oven cavity;

means for transferring radiant heat from said means for providing radiant heat energy to said oven cavity but keeping combustion gases from said radiant heat source distinct and separate from said convection air; and means for attaching said gas burning device to said gas stove maintaining integrity of said combustion gases and such that said convection air is in air communication with said oven cavity and said radiant heat source is in radiant heat communication with said oven cavity.

2. The indirect fired gas burning device according to claim 1 further comprising: means for controllably generating steam and injecting said steam into said oven; and means for appropriately mounting said means for steam generation onto said gas stove.

3. The indirect fired gas burning device according to claim 2 further comprising: means for function-controlling of said stove, said functions comprising; selection of and sequencing of, said means for generating heated combustion gases, said means for providing radiant heat energy, steam and the amount thereof generated by said means for steam generation and time of steam injection; and means for controlling temperature of said oven.

4. The indirect fired gas burning device according to claim 1 wherein said means for transferring heat is a heat exchanger which maintains separation of said heated combustion gases and said convection air.

5. The indirect fired gas burning device according to claim 1 wherein said means for generating heated combustion gases comprises: at least one bake burner tube; means of providing and substantially directing fresh air proximate to said at least one bake burner tube over substantially the length of said at least one bake burner tube; a zone adequate in size to allow the passage therethrough of a flame which will emanate from at least one of said bake burner tube when said at least one bake burner tube is appropriately connected to a source of gas and is appropriately ignited; means for causing recirculation of said heated combustion gases and said fresh air into said means for transferring heat.

6. The indirect fired gas burning device according to claim 1 wherein said means for providing radiant heat energy comprises: a broil flame channel within which a broil flame from at least one broil burner tube is contained when said radiant heat source is controllably selected, comprising a spreader plate having a width substantially equal to the length of said broil burner tube and appropriately positioned above said broil burner tube so as to permit a flame from said at least one broil burner tube to enter said broil flame channel without substantially impinging onto said spreader, and a shield plate as said means for transferring radiant heat said shield plate having a width substantially equal to the width of said spreader plate, with one end positioned appropriately below said broil burner tube and sloping upwardly and toward said spreader plate thereby creating said broil flame channel and having a front-facing broil flame channel opening with a height dimension less than the rearward spacing between said spreader and said shield, said broil flame distributed over and attached to said shield plate, said shield plate sealably attached to said oven so as to keep combustion gases from said radiant heat source separate from said convection air.

7. The indirect fired gas burning device according to claim 1 wherein said means for providing radiant heat energy is a screen burner assembly positioned above but proximate to said means for transferring radiant heat.

8. The indirect fired gas burning device according to claim 7 wherein said screen burner assembly is a low profile screen burner assembly appropriately connected to a source of gas and an appropriate means of ignition comprising:

means for forceably providing combustion air into an air/gas mixture chamber in a direction substantially orthogonal to a direction in which gas is injected into said mixture chamber;

at least one air/gas mixture distribution channel contiguous with and in air/gas mixture communication with, said mixture chamber;

a plurality of holes in said at least one air/gas mixture distribution channel, said holes providing for air/gas mixture communication from said at least one distribution channel to at least one plenum; and at least one screen positioned below said at least one plenum and which at least one plenum provides for a substantially even distribution of air/gas mixture to said at least one screen in which a flame is established upon combustion of said air/gas mixture thereby generating infrared radiant heat energy.

9. The indirect fired gas burning device according to claim 8 wherein said at least one plenum is divided into a first and a second plenum cavities by said distribution channel; and wherein said at least one screen being divided into a first and a second screen each of which screen is in air/gas communication with said first and second plenum cavities.

10. The indirect fired gas burning device according to claim 1 wherein said means for providing convection air into said oven cavity comprises a convection air blower assembly causing said convection air to circulate through said oven cavity and in heat exchange communication with said combustion gases through a convection air passage of said heat exchanger.

11. An indirect fired gas burning device for use as a radiant heat source and a convection heat source in a gas stove having an oven cavity therein said device comprising:

a convection air assembly adapted to provide heated convection air into said oven cavity;

a combustion assembly having therein a convection heat assembly for providing heated combustion gases which gases are in thermal communication with said convection air but distinct and separate from said convection air thus causing said convection air to be heated convection air and a radiant heat assembly for providing radiant heat energy to said oven cavity;

a heat transfer assembly for the transfer of heat from said heated combustion gases to said convection air and wherein said heat transfer assembly maintains said distinctness and separation of said heated combustion gases and said convection air;

radiant heat transfer assembly for providing for radiant heat communication between said radiant heat source and said oven cavity but keeping combustion gases from said radiant heat source distinct and separate from said convection air; and means for attaching said gas burning device to said oven cavity.

12. The indirect fired gas burning device according to claim 11 further comprising:

a controllable steam generation and steam injection assembly for injecting steam into said oven cavity;

means for appropriately mounting said steam generation assembly onto said gas stove;

function-controlling assembly, said functions controlled comprising; selection of and sequencing of said convection heat assembly and said radiant heat assembly, steam and the amount thereof generated by said steam generation and steam injection assembly and time of steam injection; and means for controlling temperature of said oven.

13. The indirect fired gas burning device according to claim 11 wherein said radiant heat assembly is a screen burner assembly positioned above but proximate to said radiant heat transfer assembly.

14. The indirect fired gas burning device according to claim 13 wherein said screen burner assembly is a low profile screen burner assembly appropriately connected to a source of gas and an appropriate means of ignition comprising:

means for forceably providing combustion air into an air/gas mixture chamber in a direction substantially orthogonal to a direction in which gas is injected into said mixture chamber;

at least one air/gas mixture distribution channel contiguous with and in air/gas mixture communication with, said mixture chamber;

a plurality of holes in said at least one air/gas mixture distribution channel, said holes providing for air/gas mixture communication from said at least one distribution channel to at least one plenum; and at least one screen positioned below said at least one plenum and which at least one plenum provides for a substantially even distribution of air/gas mixture to said at least one screen in which a flame is established upon combustion of said air/gas mixture thereby generating infrared radiant heat energy.

15. The indirect fired gas burning device according to claim 14 wherein said at least one plenum is divided into a first and a second plenum cavities by said distribution channel, and wherein said at least one screen being divided into a first and a second screen each of which screen is in air/gas communication with said first and second plenum cavities.

16. In an improved gas stove having an oven cavity; means for providing a radiant heat source and a convection heat source; means for providing partially mixed gas and air to at least one burner assembly controllably selected from a plurality of burner assemblies in said radiant and convection heat source; means for sensing and for controlling the temperature of the oven cavity; means for igniting said at least one burner assembly; an oven access door; said improvement comprising:

means for providing convection air into said oven cavity;

means for providing for radiant heat communication between said radiant heat source and said oven cavity but keeping combustion gases from said radiant heat source distinct and separate from said convection air;

means for generating heated combustion gases from said convection heat source for cooking and oven cleaning, wherein said heated combustion gases are integral to said means for generating said gases and separate from said convection air;

means for transferring heat from said heated combustion gases to said convection air and wherein said means for heat transfer maintains distinctness and separation of said heated combustion gases and said convection air.

17. The improved gas stove according to claim 16 wherein said means for transferring heat is a heat exchanger which maintains separation of said heated combustion gases and said convection air.

18. The improved gas stove according to claim 16 wherein said means for generating heated combustion gases comprises a bake burner tube having a plurality of flame ports thereon; means of providing and substantially directing fresh air proximate to said bake burner tube over substantially the length of said bake burner tube; a zone adequate in size to allow the passage therethrough of a flame which will emanate from said flame ports when said bake burner tube is appropriately connected to a source of gas and is appropriately ignited; means for causing recirculation of said heated combustion gases and said fresh air into said means for transferring heat.

19. The improved gas stove according to claim 16 wherein said means for providing a radiant heat source comprises a broil flame channel within which a broil flame from at least one broil burner tube is contained when said at least one broil burner tube of said radiant heat source is controllably selected, comprising a spreader plate having a width substantially equal to the length of said broil burner tube and appropriately positioned above said broil burner tube so as to permit a flame from said at least one broil burner tube to enter said broil flame channel without substantially impinging onto said spreader, and a shield plate as said means for transferring radiant heat said shield plate having a width substantially equal to the width of said spreader plate, with one end positioned appropriately below said broil burner tube and sloping upwardly and toward said spreader plate thereby creating said broil flame channel and having a front-facing broil flame channel opening with a height dimension less than the rearward spacing between said spreader and said shield, said broil flame distributed over and attached to said shield plate, said shield plate sealably attached to said oven so as to keep combustion gases from said radiant heat source separate from said convection air.

20. The improved gas stove according to claim 16 wherein said means for providing convection air into oven cavity comprises a convection air blower assembly causing said convection air to circulate through said oven cavity and in heat exchange communication with said combustion gases through a convection air passage of said heat exchanger.

21. The improved gas stove according to claim 16 further comprising means for controllably generating and injecting steam into said oven cavity; and means for appropriately mounting said steam generation means onto said gas stove.

22. The improved gas stove according to claim 16 wherein said means for providing radiant heat energy is a screen burner assembly positioned above but proximate to said means for transferring radiant heat.

23. The improved gas stove according to claim 22 wherein said screen burner assembly is a low profile screen burner assembly appropriately connected to a source of gas and an appropriate means of ignition comprising:
  means for forceably providing combustion air into an air/gas mixture chamber in a direction substantially orthogonal to a direction in which gas is injected into said mixture chamber;
  at least one air/gas mixture distribution channel contiguous with and in air/gas mixture communication with, said mixture chamber;
  a plurality of holes in said at least one air/gas mixture distribution channel, said holes providing for air/gas mixture communication from said at least one distribution channel to at least one plenum; and
  at least one screen positioned below said at least one plenum and which at least one plenum provides for a substantially even distribution of air/gas mixture to said at least one screen in which a flame is established upon combustion of said air/gas mixture thereby generating infrared radiant heat energy.

24. The improved gas stove according to claim 23 wherein said at least one plenum is divided into a first and a second plenum cavities by said distribution channel, and wherein said at least one screen being divided into a first and a second screen each of which screen is in air/gas communication with said first and second plenum cavities.

25. The improved gas stove according to claim 23 further comprising means for function-controlling of said stove, said functions controlled comprising; selection of and sequencing of said convection heat assembly and said radiant heat assembly, steam and the amount thereof generated by said means for steam generation and time of steam injection; and means for controlling temperature of said oven.

26. A method for baking, broiling, steam cooking and pyrolytic self-cleaning in a gas burning stove having therein, at least an oven cavity, a combustion assembly and a means for controllably generating and injecting steam into said oven cavity which combustion assembly has therein a convection heat assembly for providing heated combustion gases and a radiant heat assembly for providing radiant heat energy to said oven cavity said method comprising the steps of:
  function-controlling of said stove, said functions controlled comprising; selection of and sequencing of said convection heat assembly and said radiant heat assembly, steam and the amount thereof generated by said means for steam generation and time of steam injection; and means for controlling temperature of said oven when said convection heat assembly is selected;
  providing heated convection air into said oven cavity;
  distributing said heated convection air substantially evenly throughout said oven cavity;
  creating heated combustion gases, using an activated and selected convection heat assembly, for cooking and oven cleaning, wherein said heated combustion gases are integral to said combustion assembly but distinct and separate from said convection air and said combustion gases are in thermal communication with said convection air thus causing said convection air to be heated convection air;
  attaching said combustion assembly to said gas burning stove maintaining integrity of said combustion gases and such that said heated convection air is in air communication with said oven cavity and said radiant heat assembly is in radiant heat communication with said oven cavity; and
  transferring heat from said heated combustion gases to said convection air through a means for heat transfer providing said thermal communication and wherein said means for heat transfer maintains said distinctness and separation of said heated combustion gases and said convection air obtaining said heated convection air.

* * * * *